United States Patent [19]
Colegrove et al.

[11] Patent Number: 4,677,273
[45] Date of Patent: Jun. 30, 1987

[54] ELECTRON BEAM WELDING APPARATUS

[75] Inventors: Russell K. Colegrove, East Longmeadow, Mass.; William M. Stone, Somers, Conn.

[73] Assignee: Leybold-Heraeus GmbH, Cologne, Fed. Rep. of Germany

[21] Appl. No.: 907,366

[22] Filed: Sep. 12, 1986

Related U.S. Application Data

[63] Continuation of Ser. No. 828,733, Feb. 12, 1986.

[51] Int. Cl.⁴ .............................................. B23K 15/00
[52] U.S. Cl. ...................... 219/121 EC; 219/121 EL; 219/121 EU; 248/333
[58] Field of Search ................. 219/121 EU, 121 EV, 219/121 EW, 121 EC, 121 ED, 121 EL, 121 EN, 121 EP; 248/333, 334.1, 335, 336, 337, 338; 403/109

[56] References Cited

PUBLICATIONS

"GCA XR 50 M Monomast Overhead Gantry Robots, where Precision and Large Work Area Coverage are Critical", GCA Corporation.
"Series 7000 Welding Robots", Descriptive Bulletin 22-550, Westinghouse Electric Corporation.
"Mark VII Computer-Controlled Hard Vacuum Systems . . . for Maximum Flexibility and Increased Productivity in Electron Beam Welding", Bulletin 375, pp. 1–16, Sciaky.
"Industrial Robots & Controls", pp. 1–6, unnumbered page, p. 2 and p. 7.

*Primary Examiner*—C. L. Albritton
*Attorney, Agent, or Firm*—Felfe & Lynch

[57] ABSTRACT

An electron-beam welding apparatus includes a vacuum chamber and a gantry entirely within the chamber for adjustably supporting an electron-beam welding gun with x, y and z coordinates of adjustability with respect to mutually perpendicular x-, y- and z-axes within the chamber. The gantry includes apparatus telescoping along the z-axis for adjustably supporting the electron-beam welding gun with respect to the z-axis.

16 Claims, 16 Drawing Figures

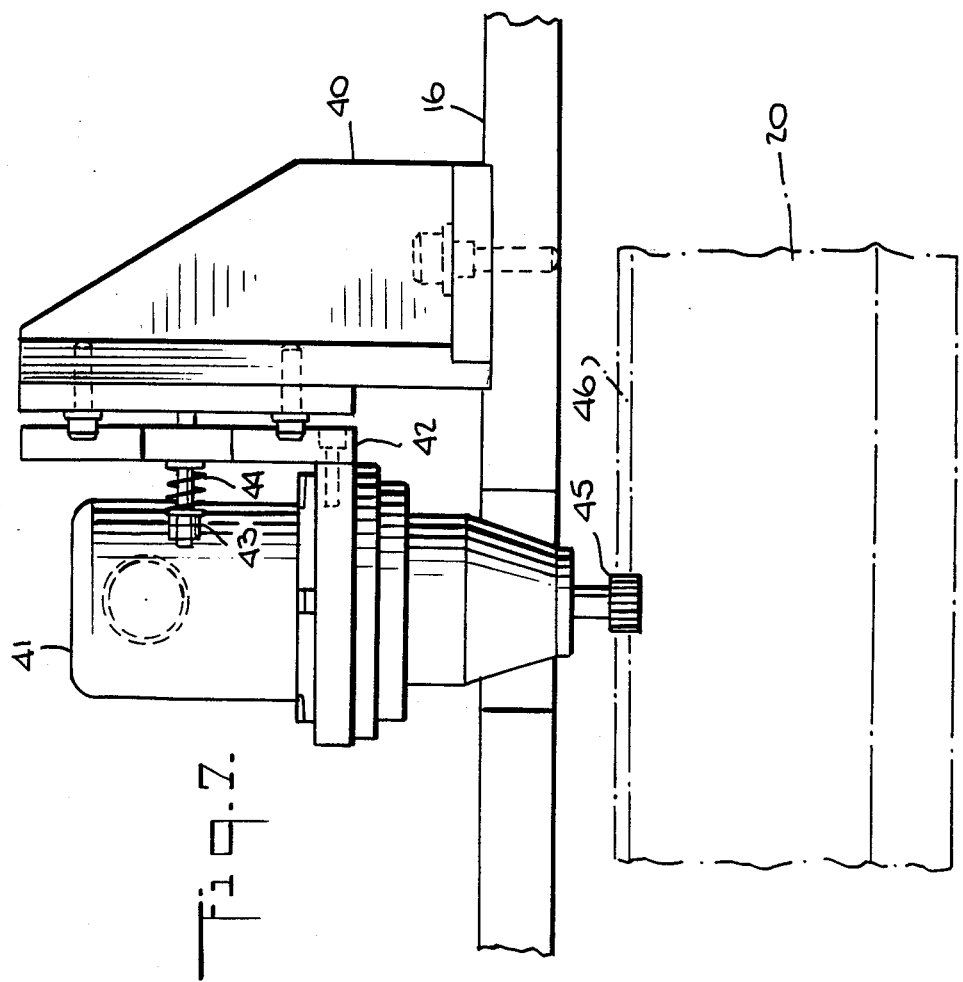
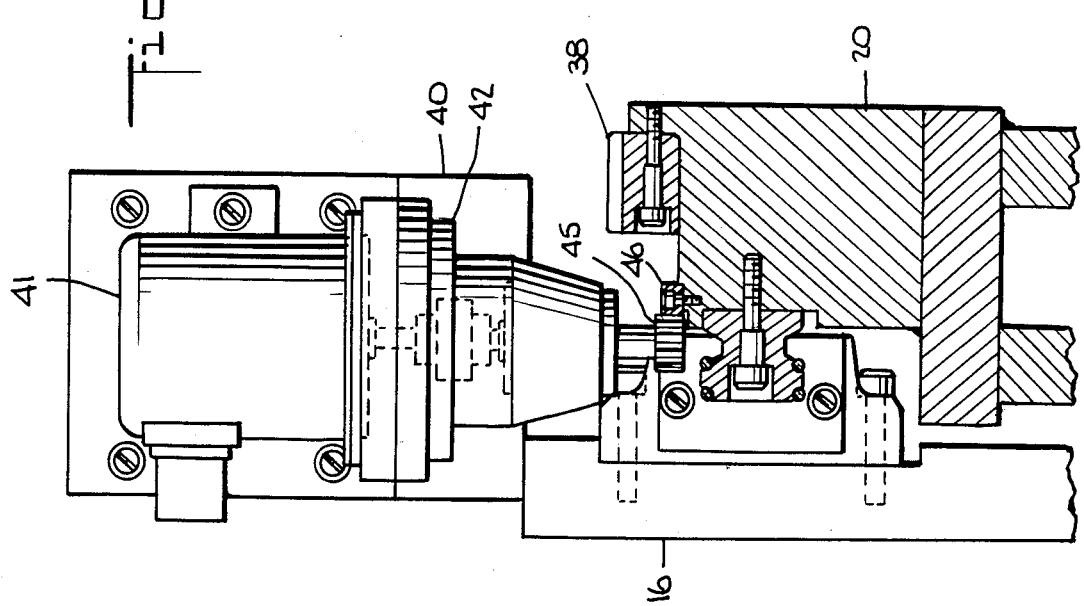

Fig. 1S.
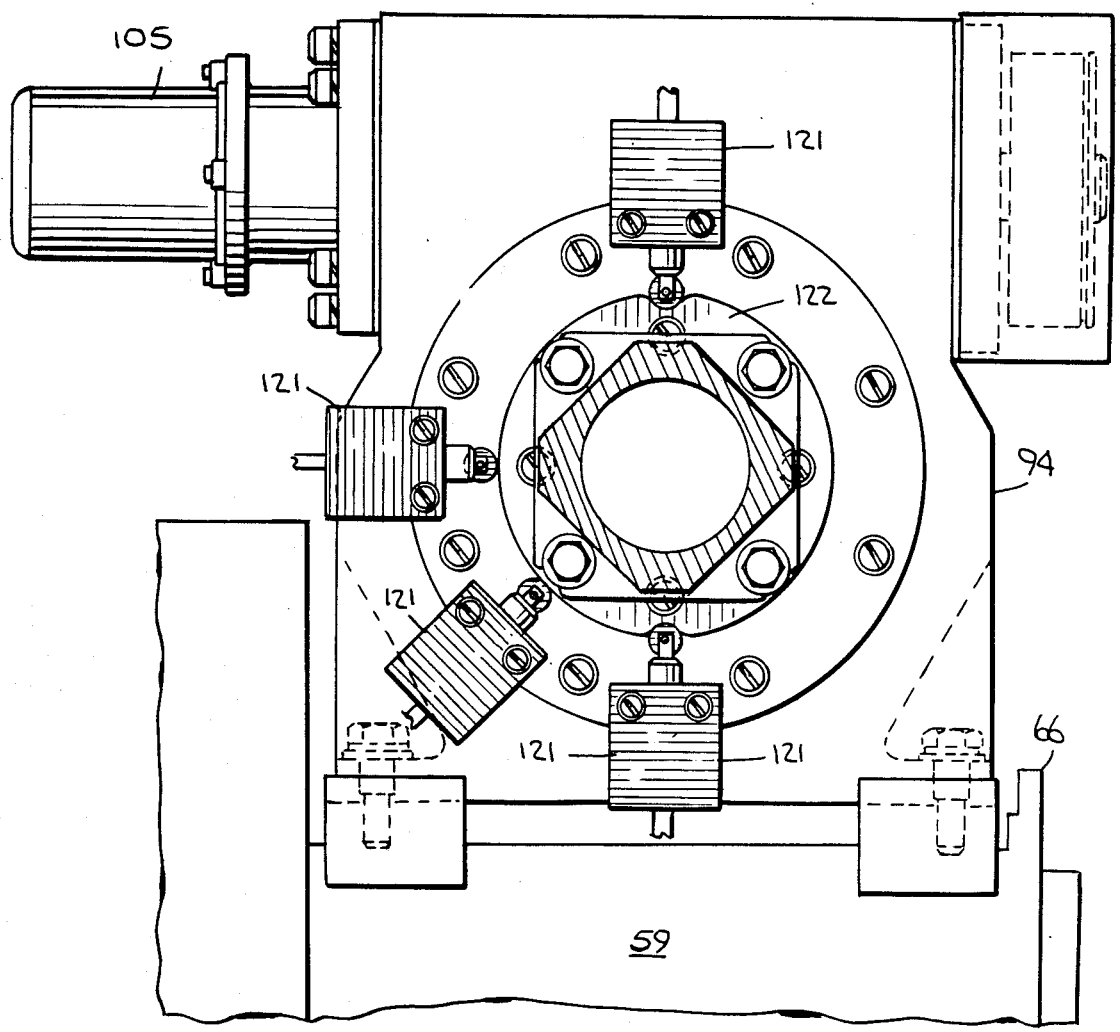
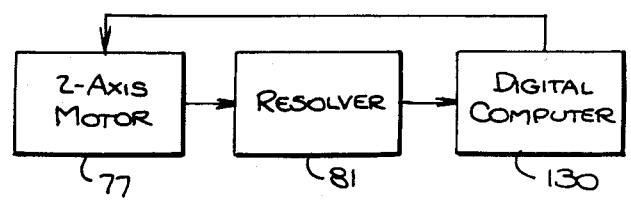
Fig. 1B.

ELECTRON BEAM WELDING APPARATUS

This is a continuation of application Ser. No. 828,733, filed Feb. 12, 1986.

This invention relates to electron-beam welding apparatus and, more particularly, to mobile electron-beam welding apparatus. The invention also relates to a vertical support suitable for use in mobile electron-beam welding apparatus.

One prior robotic system capable of movement along x-, y-, and z-axes and also capable of pivoting around the z-axis and tilting with respect to the z-axis utilizes telescoping tubes along the z-axis together with a single ball screw. The collapsed length of the telescope can not then be any shorter than the stroke length, which is a severe disadvantage in a vacuum chamber since space in the vacuum chamber is limited.

Prior mobile electron-beam welding apparatus for use in a vacuum chamber have the limitation that either they require the extension of the supporting apparatus through the vacuum chamber through sliding seals which require service, or they do not allow the welding apparatus to move completely around a part to be welded—or to move inside a part to be welded. Some prior electron-beam welding apparatus have had both of the above limitations.

It is an object of the present invention, therefore, to provide a new and improved electron-beam welding apparatus which avoids one or more of the disadvantages and limitations of prior such apparatus.

It is another object of the invention to provide a new and improved mobile electron-beam welding apparatus which avoids one or more of the disadvantages and limitations of prior such apparatus.

It is another object of the invention to provide a new and improved mobile electron-beam welding apparatus which is adjustable with respect to x-, y-, and z-axes with a high degree of accuracy, for example, ±0.001 inch.

It is another object of the invention to provide a new and improved mobile electron-beam welding apparatus which minimizes the space required by the apparatus in a vacuum chamber for welding at a maximum number of points.

It is another object of the invention to provide a new and improved vertical support having a maximized extended length and a minimized collapsed length and suitable for use in mobile electron-beam welding apparatus.

It is another object of the invention to provide a new and improved vertical support which is adjustable along a vertical axis with a high degree of accuracy.

In accordance with the invention, an electron-beam welding apparatus comprises a vacuum chamber and a gantry entirely within the chamber for adjustably supporting an electron-beam welding gun with x, y and z coordinates of adjustability with respect to mutually perpendicular x-, y- and z-axes within the chamber. The gantry includes means for telescoping along the z-axis for adjustably supporting the electron-beam welding gun with respect to the z-axis.

Also in accordance with the invention, a vertical support comprises telescoping tubes having a collapsed length shorter than the stroke length of the tubes. The support also includes a supporting telescoping screw within the tubes for supporting the same and having a collapsed length shorter than the stroke length of the screw.

For a better understanding of the present invention, together with other and further objects thereof, reference is made to the following description, taken in connection with the accompanying drawings, and its scope will be pointed out in the appended claims.

Referring now to the drawings:

FIG. 6 is a fragmentary, sectional view, to an enlarged scale, of a portion of the FIG. 3 apparatus taken along line 6—6 of FIG. 3;

FIG. 7 is a fragmentary, side elevational view of the FIG. 6 portion of the apparatus;

FIG. 15 is a fragmentary, sectional view of the FIG. 14 portion of the apparatus taken along line 15—15 of FIG. 14; and FIG. 16 is a schematic diagram of a z-axis feedback loop of the apparatus.

Figure 1:
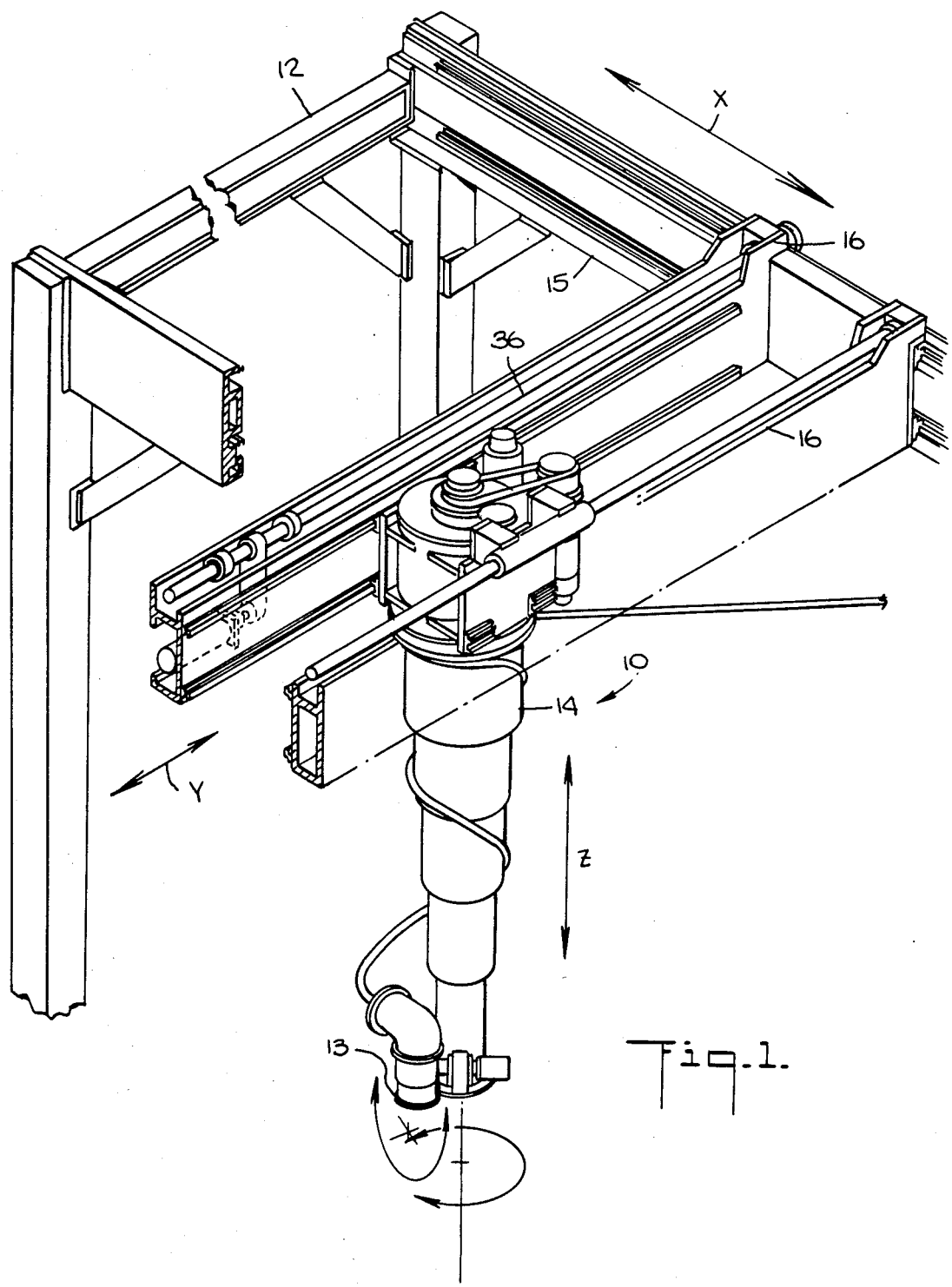
FIG. 1 is a fragmentary, perspective view of mobile electron-beam welding apparatus constructed in accordance with the invention.
Figure 2:
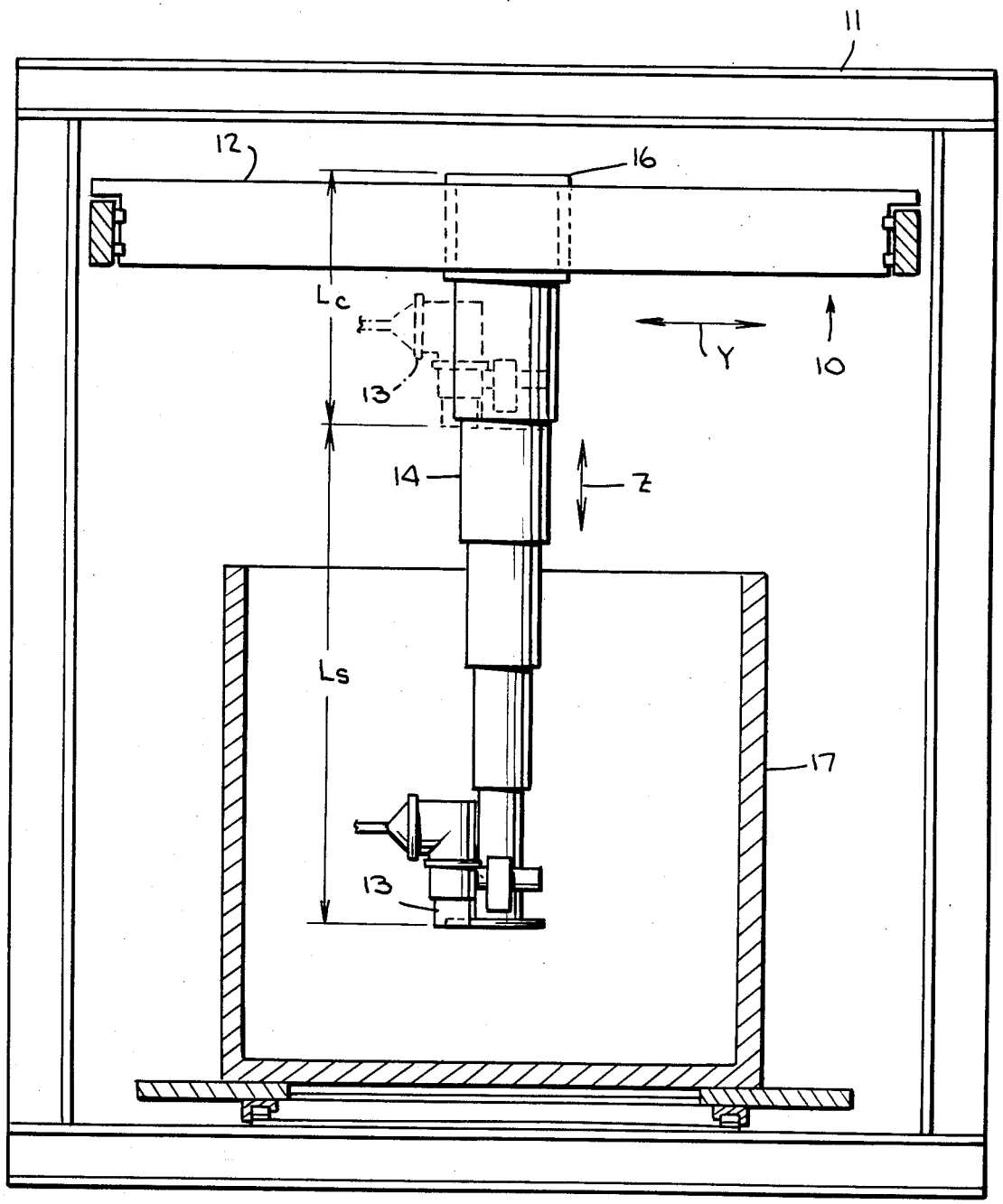
FIG. 2 is a fragmentary, sectional view of the FIG. 1 apparatus in a vacuum chamber and inserted into a part to be welded.

Referring now more particularly to FIGS. 1 and 2 of the drawings, an electron-beam welding apparatus 10 comprises a vacuum chamber 11 and a gantry 12 entirely within the chamber for adjustably supporting an electron-beam welding gun 13 with x, y and z coordinates of adjustability with respect to mutually perpendicular x-, y-, and z-axes within the chamber. The gantry 12 includes means 14 telescoping along the z-axis for adjustably supporting the electron-beam welding gun 13 with respect to the z-axis. As used in this specification and the claims, the z-axis refers to an axis which passes longitudinally through the telescoping means.

The gantry comprises a frame 15 having a carriage 16 movable thereon with respect to an x-axis. The carriage has an apparatus 14 thereon which telescopes along the z-axis and which is supported movably with respect to the y-axis. In FIG. 2 the electron-beam gun 13 is represented in solid line construction with the telescoping means 14 fully extended and the electron beam welding gun 13 is represented in broken line construction in a position which it would have with the telescoping means 14 fully collapsed. A container shaped part 17 is represented in section in FIG. 2 for welding internally by the electron-beam welding apparatus.

Figure 3:
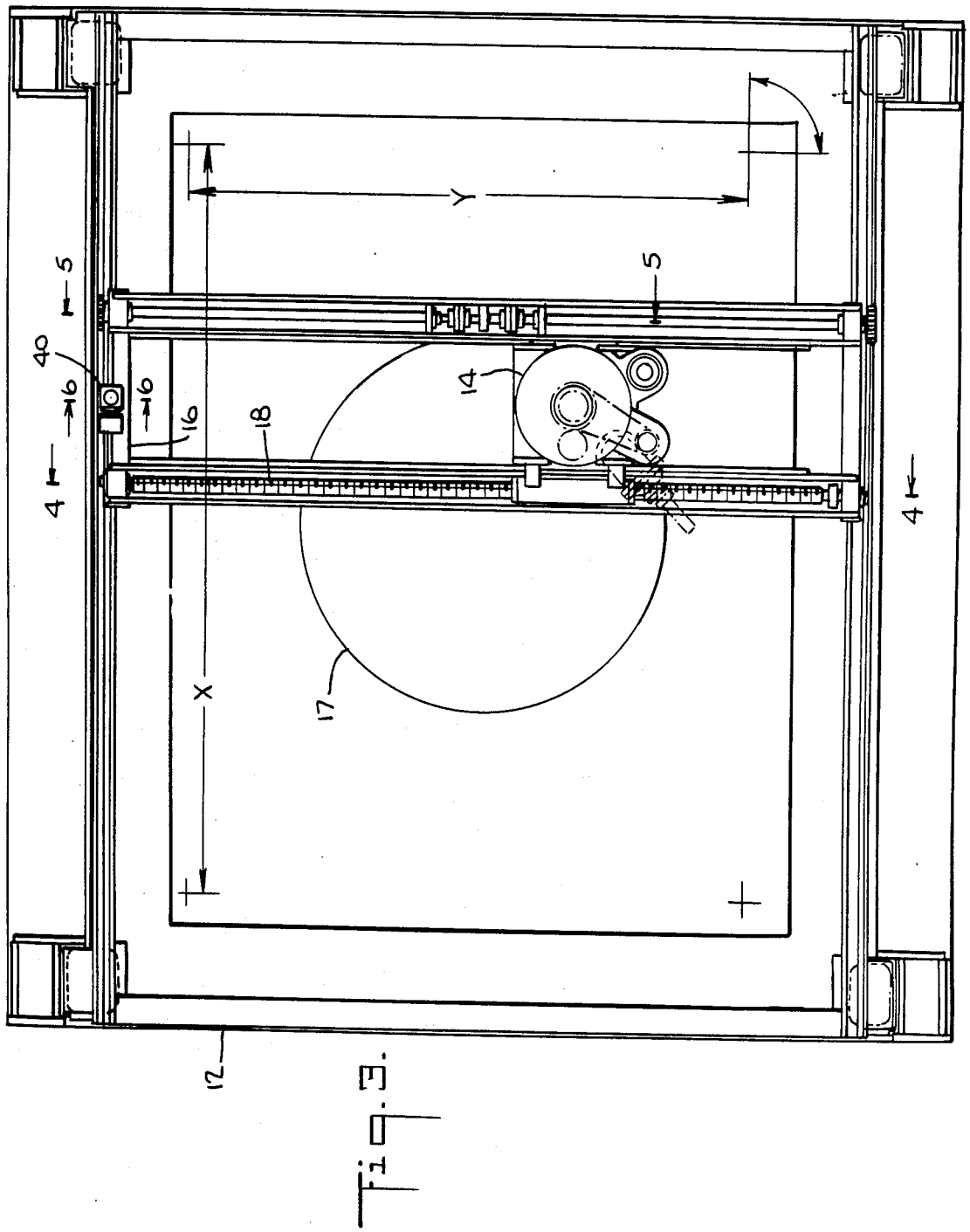
FIG. 3 is a plan view of the FIG. 1 apparatus.

Referring now more particularly to FIG. 3 of the drawings, the gantry 12 is represented in plan view without the vacuum chamber 11 also being represented for clarity. The container 17 to be welded is also represented in FIG. 3. The telescoping means 14 is represented as being adjustably positioned along a y-motion ball screw 18 which forms a portion of the y-carriage 16 which is movable with respect to an x-axis by means to be explained subsequently.

Figure 4:
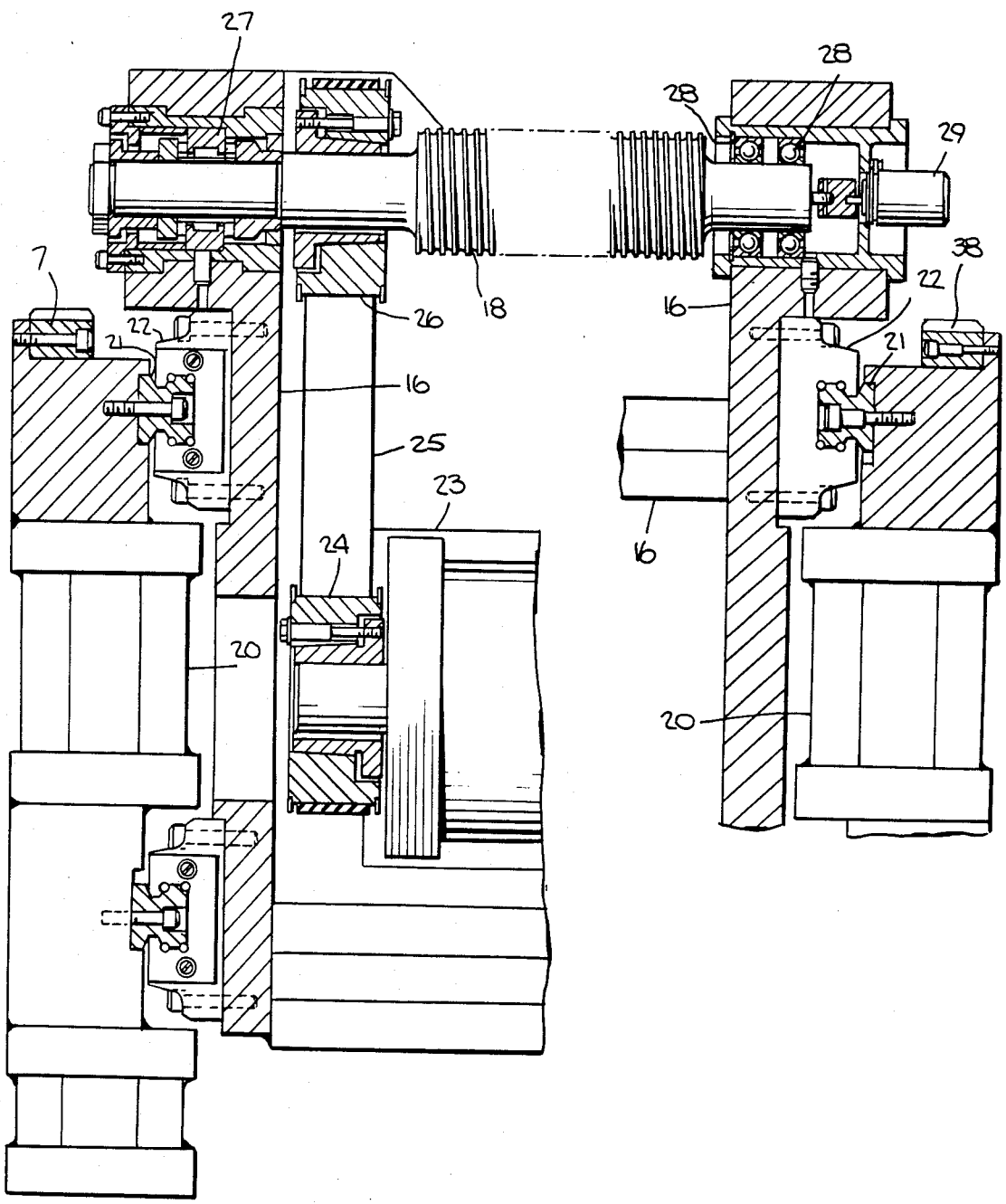
FIG. 4 is a fragmentary, sectional view, to an enlarged scale, of a portion of the FIG. 3 apparatus taken along the line 4—4 of FIG. 3.

Referring now more particularly to FIG. 4 of the drawings, x-support beams 20 have mounted thereon rails 21 which provide x-linear bearing rails for supporting the y-carriage 16 having suitable linear bearings 22.

The y-motion is accomplished by a y-drive motor 23 suitably mounted on the y-carriage 16 and coupled through a pulley 24 and drive belt 25 to a pulley 26 mounted on the y-motion ball screw 18. The ball screw 18 is rotatably mounted in a suitable bearing 27, for example, a radial needle-cylindrical roller thrust bearing, on the y-carriage 16 at one end thereof and is rotatably mounted in ball bearings 28 on the y-carriage 16 at the other end thereof, where the y-ball screw is coupled to a y-motion resolver 29, which may, for example, be Harowe Servo Controls Inc., Model No. 112RW-300-F58A. The y-motion resolver 29 provides an output signal component representing the y-motion of the telescoping screw to indicate the position of the bottom 66 of the telescoping screw with respect to the y-axis. The apparatus also includes computer means responsive to the output signal of the resolver 29 for controlling the y-drive motor 23.

Figure 5:
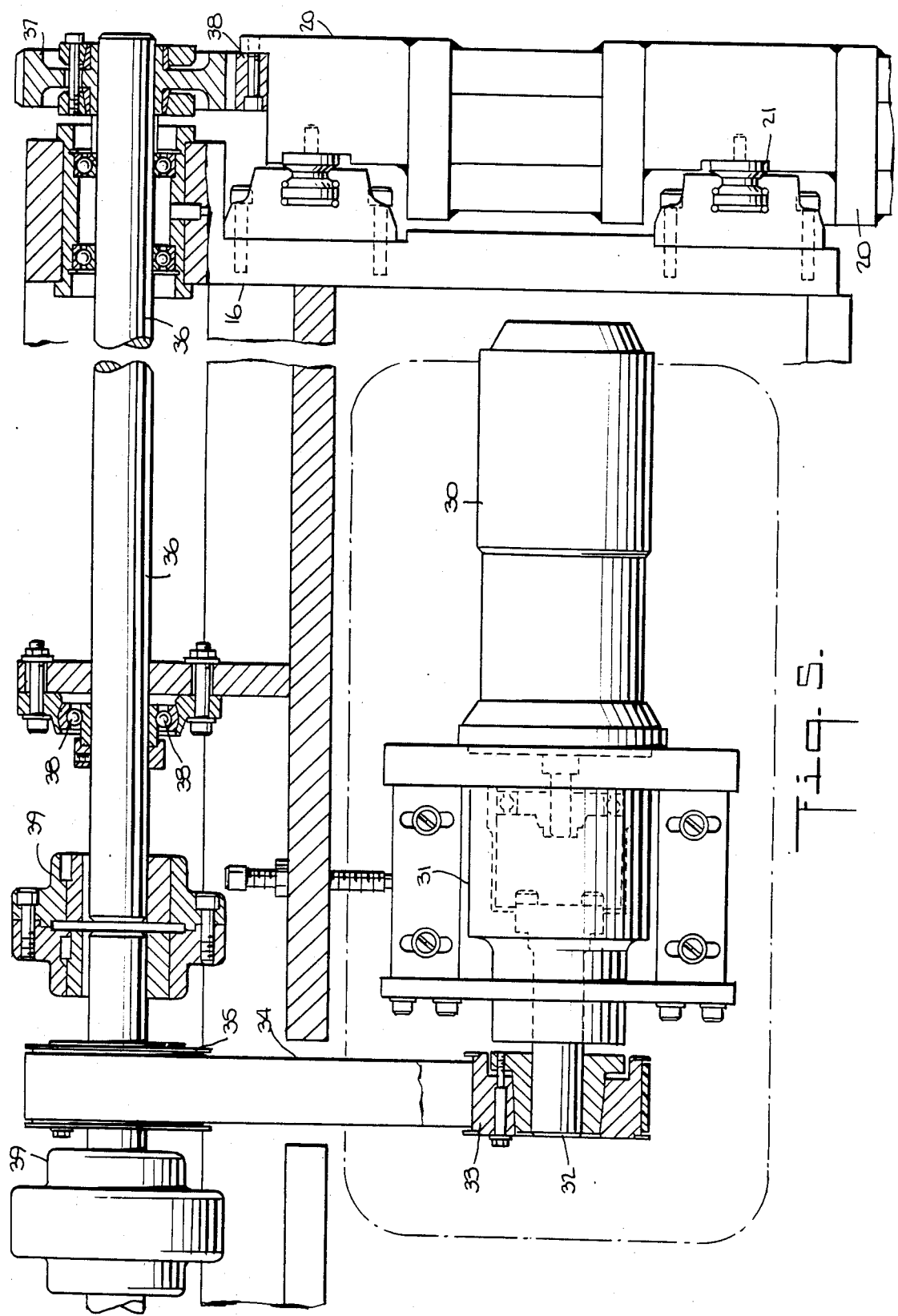
FIG. 5 is a fragmentary, sectional view, to an enlarged scale, of a portion of the FIG. 3 apparatus taken along line 5—5 of FIG. 3.

Referring now more particularly to FIG. 5, the y-carriage 16 is driven along the x-axis by a motor 30 mounted on the y-carriage 16 and coupled to a shaft 32, for example, through a suitable harmonic gear reduction unit 31 of conventional construction and commercially available from Harmonic Drive Div., USM Corp., Model No. HDC-1M. The output shaft 32 of the gear reduction unit 31 is coupled by a pulley 33 and drive belt 34 to a pulley 35 mounted on an x-motion drive shaft 36 on which there is mounted a pinion 37 rotatable on and movable along a rack 38 mounted on the x-support beam 20. The drive shaft 36 is rotatable within ball bearings 38 mounted on the y carriage 16. When the x-drive motor drives the drive shaft 36, the y-carriage 16 moves therealong in accordance with the motion of the pinion 37 on the rack 38. Suitable couplings 39 are utilized to couple segments of the drive shaft 36 together so that the drive belt 34 can be readily changed.

Referring now more particularly to FIGS. 6 and 7, there is mounted on the y-carriage 16 a support 40 for an x-motion resolver 41 which is mounted on a spring-loaded plate 42 through which a spring-loaded bolt 43 extends and is attached to the support 40. The bolt 43 is spring loaded by spring 44 to absorb the force of sudden changes of motion of the support 40. The x-motion resolver 41 may be, for example, Harowe Servo Controls Inc., Model No. 112RW-300-F58A. The x-motion resolver 41 is coupled through a suitable coupling unit 42 to a pinion 45 which engages a rack 46 extending along the x-support beam 20. The x-motion resolver 41 provides an output signal component to indicate the position of the bottom 66 of the telescoping screw with respect to the x-axis. The apparatus also includes computer means responsive to the output signal of the resolver 41 for controlling the x-drive motor 30.

Figure 8:
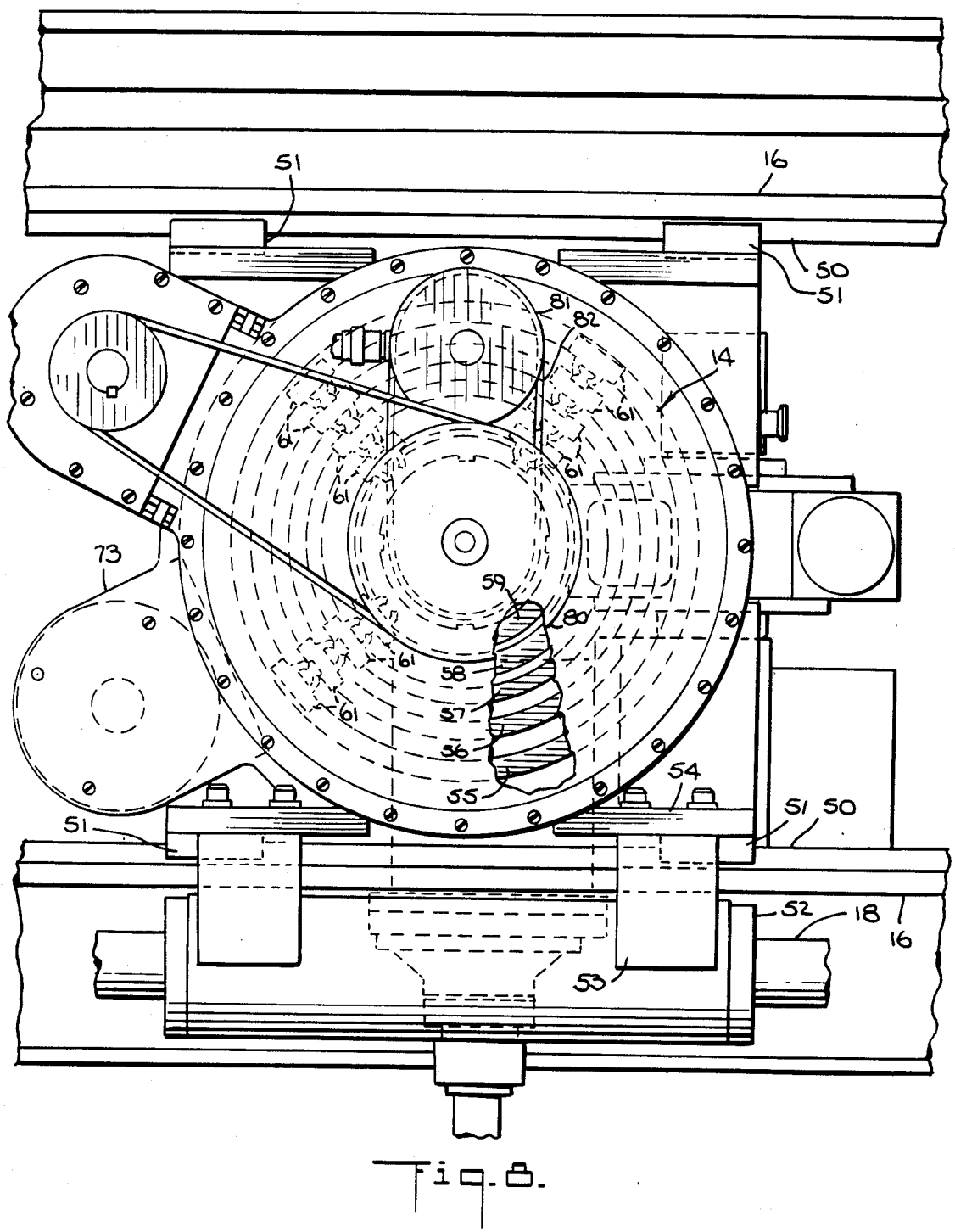
FIG. 8 is a fragmentary, plan view, to an enlarged scale, of a portion of the FIG. 1 apparatus.

Referring now more particularly to FIGS. 8, 9, 10 and 11, there is represented means 14 telescoping along the z-axis for adjustably the electron-beam welding gun with respect to the z-axis. In FIG. 8 the z-axis is perpendicular to the plane of the paper.

The telescoping means 14 is supported by linear bearings 51 on linear rails 50 of the y-carriage 16. Two ball nuts 52 on the y-drive screw 18 are attached by member 53 to a plate 54 attached to the linear bearings 51 for displacing the telescoping means 14 along the y-carriage 16 in the y-direction.

Figure 9:
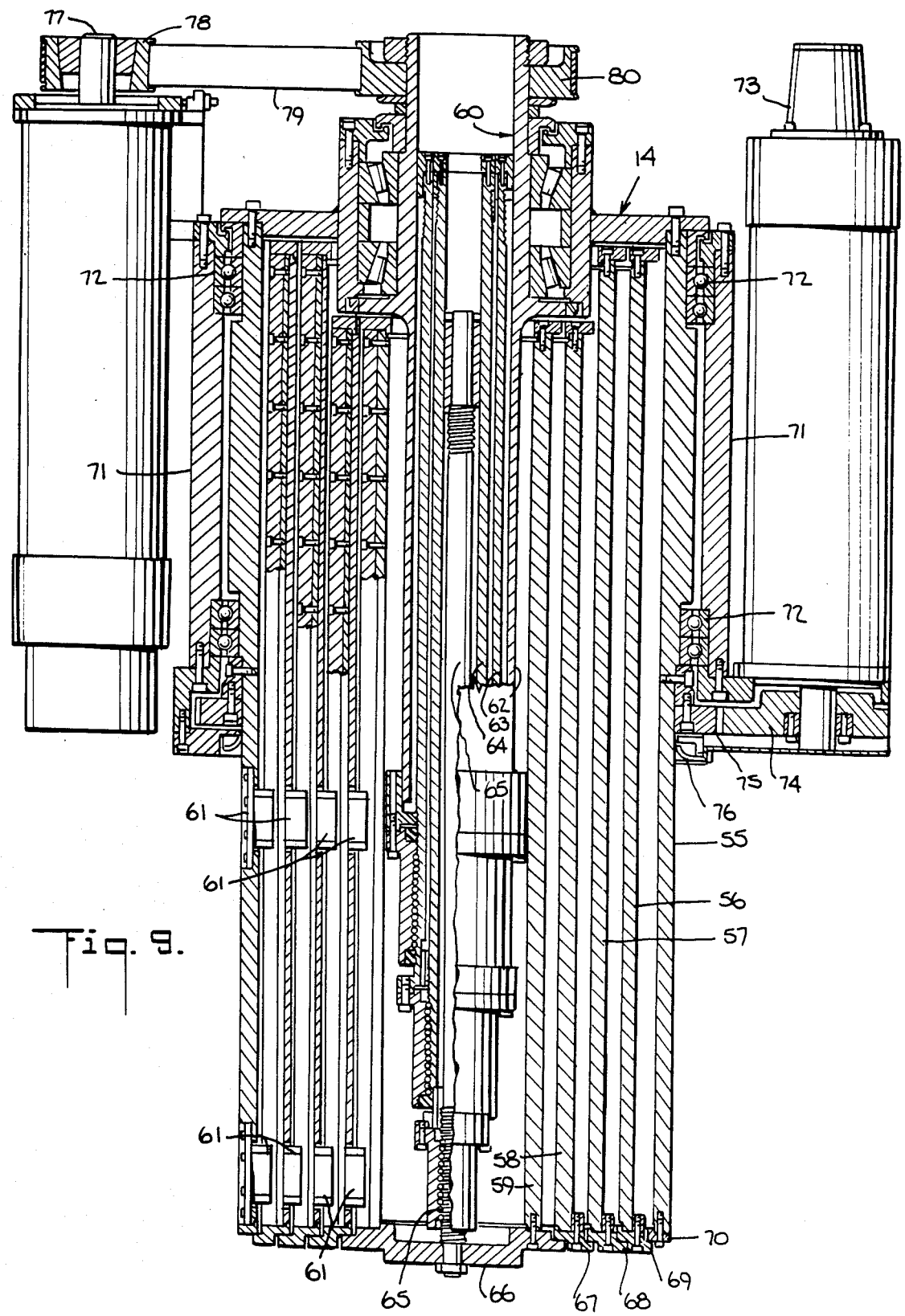
FIG. 9 is a sectional view, to an enlarged scale, of a portion of the FIG. 1 apparatus with telescoping tubes and telescoping screw collapsed.

The telescoping means 14 comprises telescoping tubes 55, 56, 57, 58, 59 having a collapsed length Lc represented in FIGS. 2 and 9 shorter than the stroke length Ls of the tubes represented in FIG. 2. The collapsed length Lc may, for example, be 43 inches and the stroke length Ls may, for example, be 70 inches. The telescoping means 14 also includes a supporting telescoping screw 60 within the tubes for supporting the same and having a collapsed length which corresponds to the collapsed length of the tubes represented in FIGS. 2 and 9 shorter than the stroke length of the screw which corresponds to the stroke length of the tubes represented in FIG. 2. The telescoping tubes 55, 56, 57, 58, 59 have suitable sets of sliding bearings and rails 61 therebetween. Each of the portions 63, 64, 65 of the telescoping screw is mounted as a ball screw within the surrounding portion 62, 63, 64, respectively. The internal screw portion 65 supports a bottom plate 66 which in turn supports shaped plates 67, 68, 69, 70 attached to telescoping tubes 58, 57, 56, 55, respectively. The outermost telescoping tube 55 is rotatably mounted with respect to a stationary wall 71 by suitable ball bearings 72. A pivot motor 73 drives a pinion 74 which meshes with a gear 75 on the telescoping tube 55 to rotate the telescope. A seal 76 prevents any contaminants, from the welding process, from entering the telescoping means 14 and the stationary wall 71. A z-axis motor 77 through a suitable pulley 78, drive belt 79 and driven pulley 80 drives the telescoping screw 60 to extend and retract the screw and thus also the telescoping tubes.

The apparatus includes the z-axis motor 77 for rotating the telescoping screw 60, a resolver 81 comprising a stator and a rotor with the stator being mounted to rotate with the outermost of the telescoping tubes 55 and the rotor being coupled to rotate with the outermost portion 62 of the telescoping screw 60 for providing an output signal component representing the rotation of the telescoping screw by the z-axis motor to indicate the position of the bottom 66 of the telescoping screw with respect to the z-axis. The apparatus also includes computer means 130, represented schematically in FIG. 16, responsive to the output signal of the resolver 81 for controlling the z-axis motor 77.

The apparatus includes the pivot motor 73 for rotating the outermost 55 of the telescoping tubes. The telescoping tubes 55, 56, 57, 58, 59 are rotatably coupled together and are rotatably coupled with the innermost portion 65 of the telescoping screw 60. The resolver 81 provides an output signal component representing rotation of the outermost telescoping tube 55 by the pivot motor 73 to indicate any component of change of position of the bottom 66 of the telescoping screw with respect to the z-axis due to rotation of the outermost telescoping tube 55 by the pivot motor 73 and to enable the computer to compensate for such component of change of position. The resolver 81 also provides output signal components representing changes of position of the outermost telescoping tube 55 and the electron-beam welding gun with respect to the x-axis and the y-axis due to rotation by the pivot motor 73. The apparatus also includes computer means responsive to the output signal of the resolver 81 for controlling the pivot motor 73. The computer also includes means responsive to the output signal of the resolver 81 for controlling the x-axis and y-axis motors to accomplish any x-axis and y-axis changes needed during the pivoting of the electron-beam welding gun.

From the foregoing description it will be apparent that a vertical support comprises telescoping tubes 55, 56, 57, 58, 59 having a collapsed length shorter than the stroke length of the tubes. The support includes a supporting telescoping screw 60 within the tubes for supporting the same and having a collapsed length shorter than the stroke length of the screw 60. The telescoping tubes include innermost, outermost and intervening tubes which are longitudinally slidable with respect to each other. The telescoping tubes are rotatable as a unit and are non-rotatable with respect to each other. The telescoping screw has telescoping screw portions which are rotatable with respect to each other and which include an outermost screw portion 62. The telescoping screw includes an innermost telescoping screw portion 65 which has a horizontal plate member 66 attached thereto and attached to the innermost tube 59 and supporting the innermost tube and tubes between the innermost and the outermost tubes. The outermost tube 55 is rotatable by the pivot motor 73. The z-axis motor 77 rotates the outermost screw portion 62, tending to cause a vertical displacement of the horizontal plate member 66 and a vertical displacement of at least one of the tubes.

Figure 10:
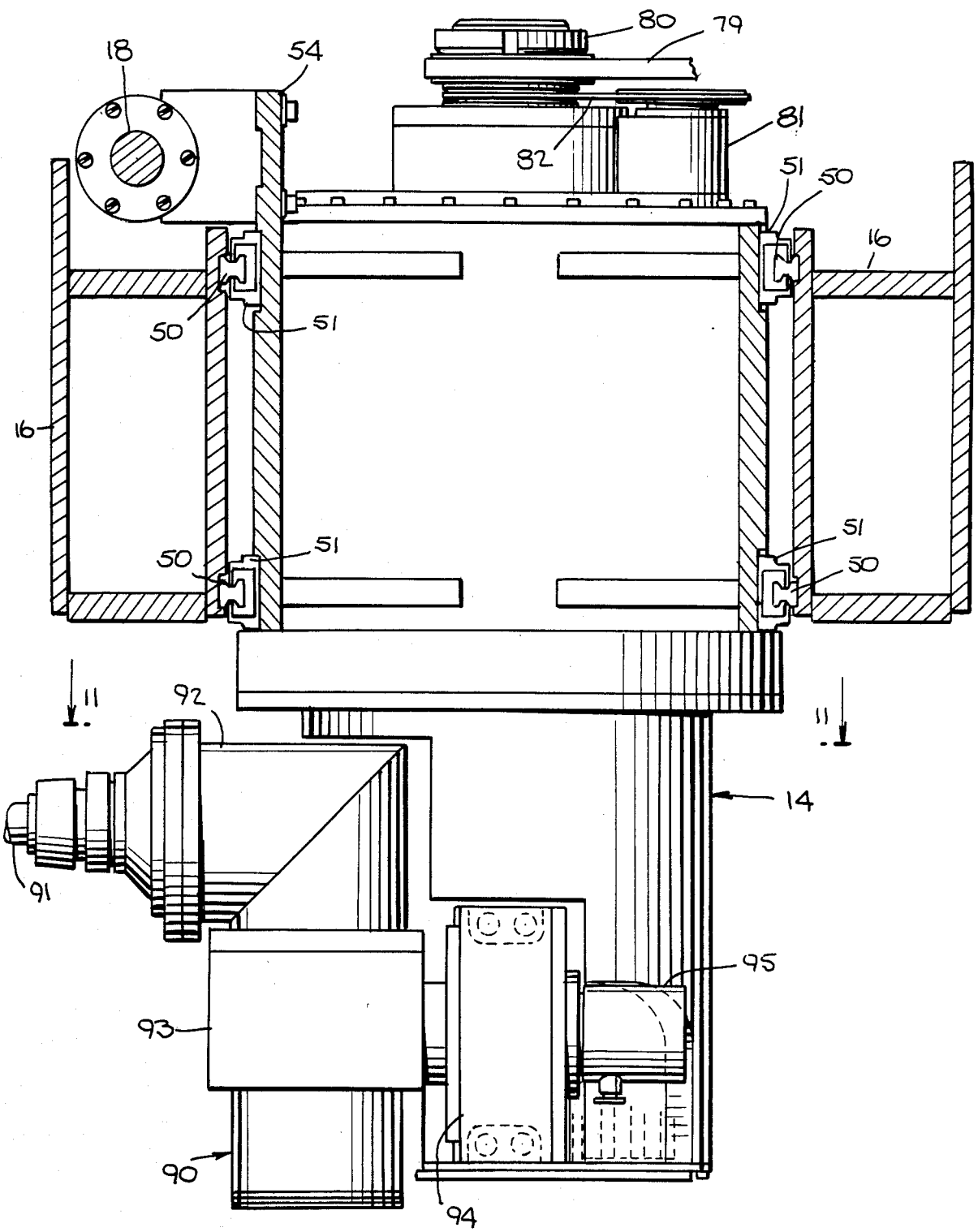
FIG. 10 is a side, elevational view, to an enlarged scale, of a portion of the FIG. 1 apparatus with the telescoping tubes and telescoping screw collapsed.

Referring now more particularly to FIG. 10, the telescoping means 14 is represented in a collapsed position with electron-beam welding apparatus 90 rotatably positioned in a cut-out or recessed portion of the telescoping tubes of the telescoping means 14. The electron-beam welding apparatus 90 is described and claimed in a copending application of Russell K. Colegrove and Glen S. Lawrence, Serial No. 763,024, filed Aug. 6, 1985. The electron-beam welding apparatus 90 includes a high voltage cable 91 coupled through an outer housing 92 having insulator means therein to a cathode cooperative with an anode and including a valve for sealing the cathode and the anode in the outer housing in one position of operation, the valve being housed in unit 93 which is rotatably supported by a tilt device 94 also supporting a turbomolecular pump 95 communicating with the electron-beam gun in unit 93. This provides for evacuation of the electron-beam welding apparatus 90.

Figure 11:
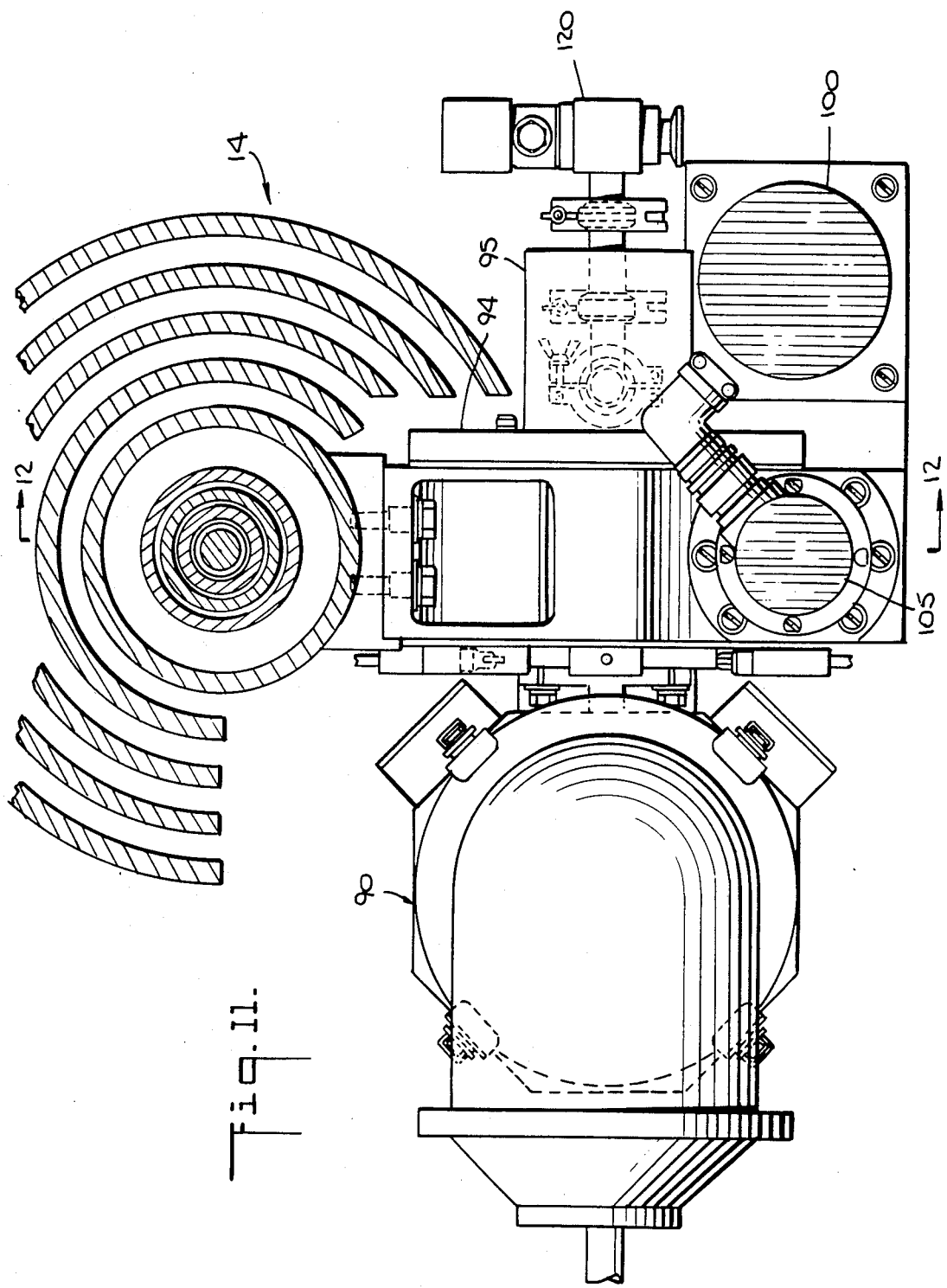
FIG. 11 is a fragmentary, sectional view of the FIG. 10 apparatus taken along line 11—11 of FIG. 10.
Figure 12:
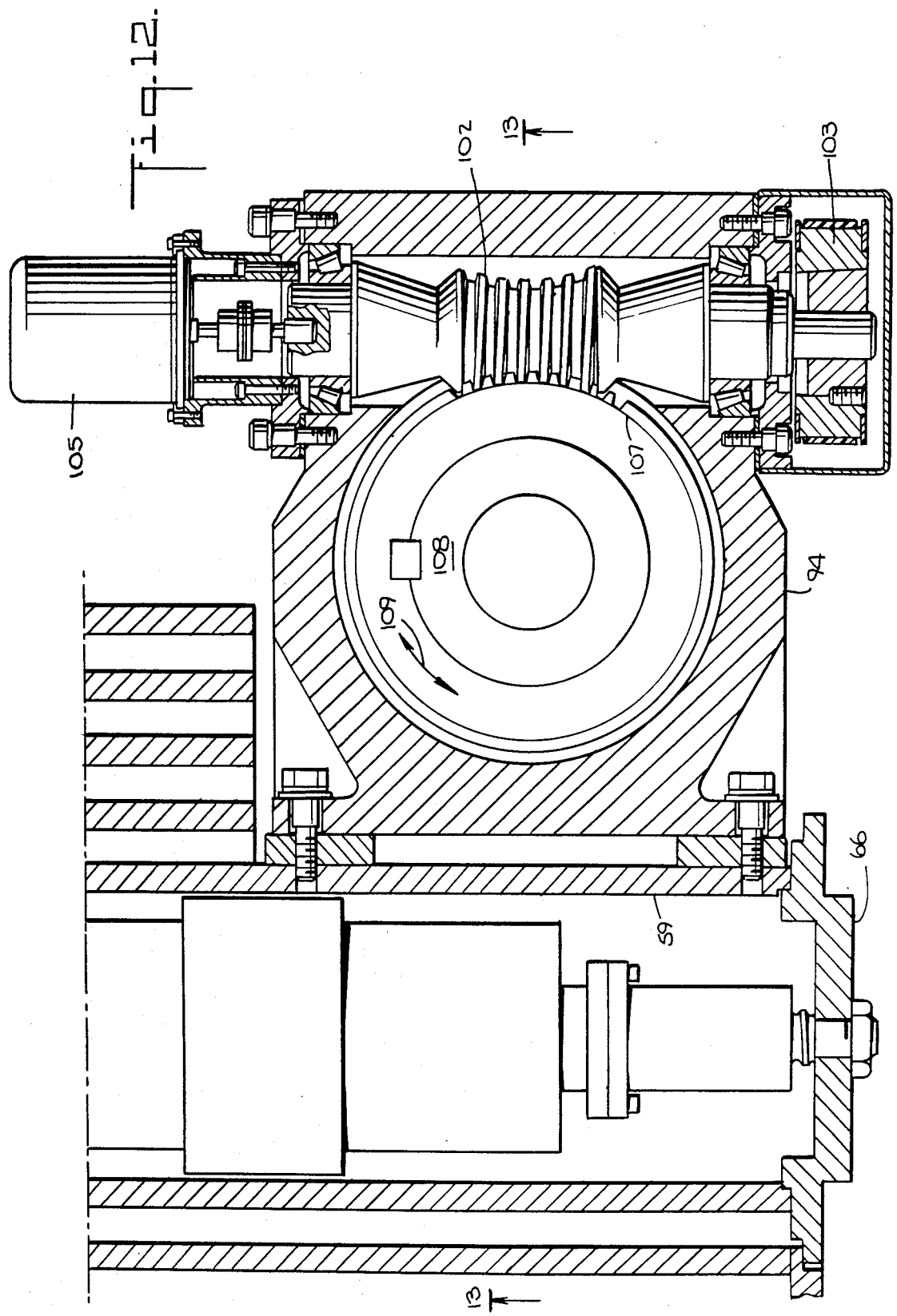
FIG. 12 is a fragmentary, sectional view, to an enlarged scale, of a portion of the FIG. 11 apparatus taken along line 12—12 of FIG. 11.
Figure 13:
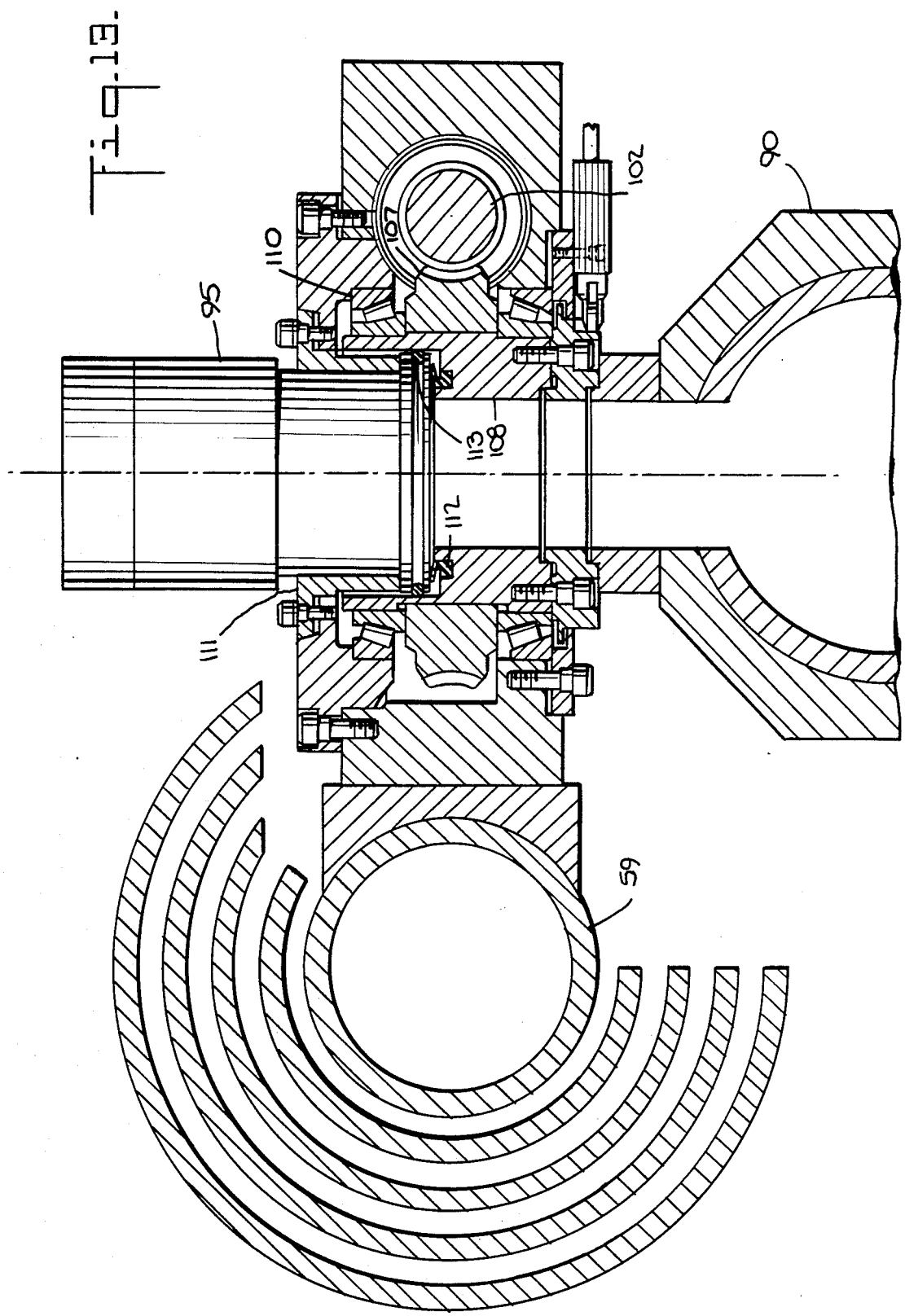
FIG. 13 is a fragmentary, sectional view of the FIG. 12 apparatus taken along line 13—13 of FIG. 12.
Figure 14:
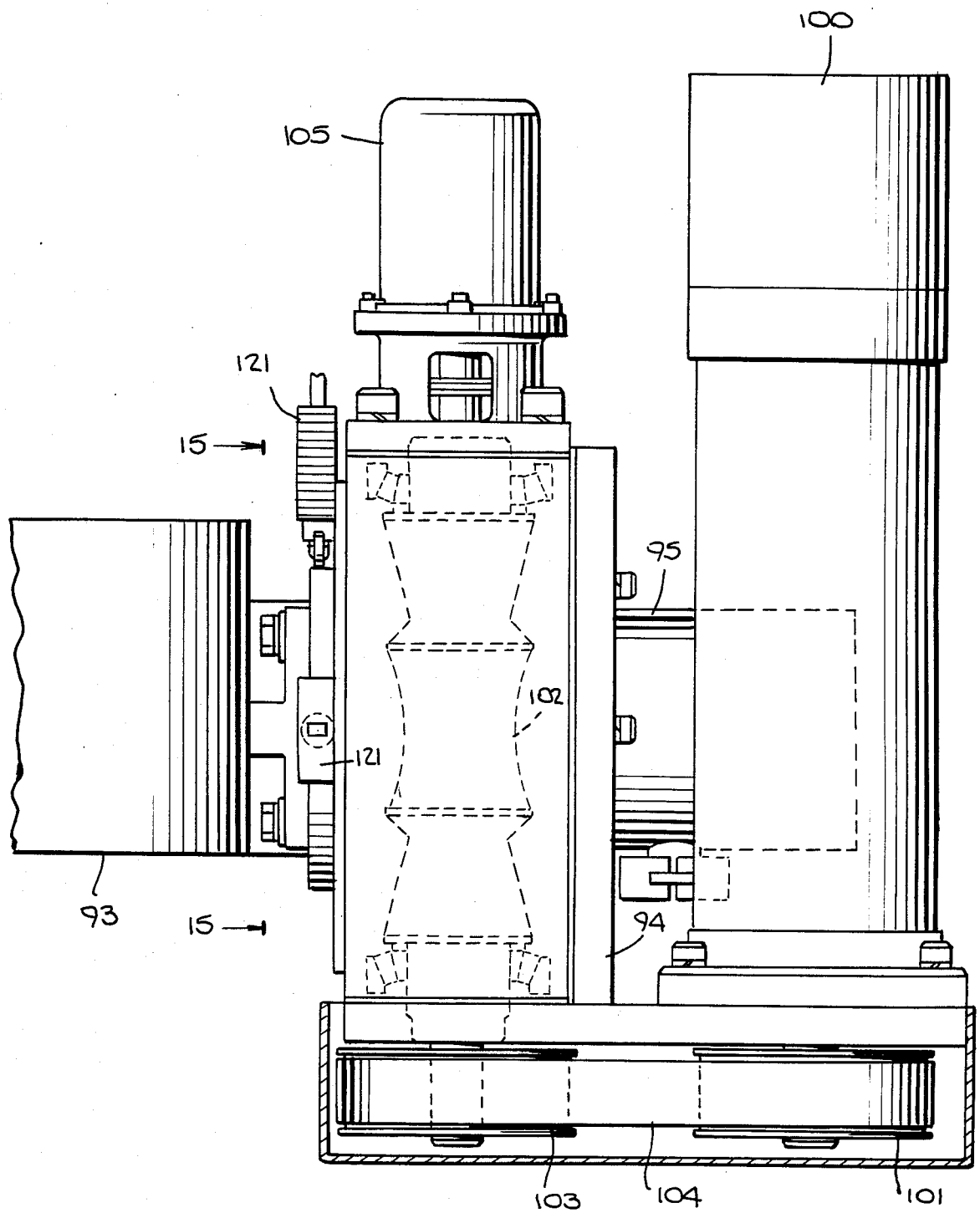
FIG. 14 is a fragmentary, side elevational view of the FIG. 12 apparatus.

Referring now more particularly to FIGS. 11-15, inclusive, the telescoping means 14 has bolted thereto the tilt device 94 supporting the electron-beam welding apparatus 90 and the turbomolecular pump 95. A tilt motor 100 having a drive pulley 101 drives a worm 102 having a driven pulley 103 through a belt 104. A tilt resolver 105 for indicating position of the electron beam gun with respect to the tilt axis is connected to the worm 102. Computer means responsive to the output signal of the resolver 105 controls the tilt motor 100. The worm 102 drives a worm gear 107 mounted on and keyed to a hollow shaft 108 supporting the electron-beam welding apparatus 90 for rotary motion as indicated by the arrow 109. The tilt mechanism is bolted to the telescoping tube 59. The electron-beam gun is rotatably mounted by roller bearings 110 for rotation by the worm 102 and the worm gear 107. The turbomolecular pump 95 is also mounted on the tilt mechanism. The turbomolecular pump 95 is supported in position by clamp retainer 111. It does not rotate with the hollow shaft 108. A vacuum seal is maintained by face seal 112 and "O" ring. This allows the turbomolecular pump 95 to communicate with the electron-beam welding apparatus 90 while it is being rotated by the tilt device 94 and full vacuum is maintained in the electron-beam welding apparatus. A foreline valve 120 for the turbomolecular pump 95 is represented in FIG. 11.

Suitable limit switches 121 (FIG. 15) activated by a plate 122 rotatable with the gun housing portion 93 preferably are utilized to provide electrical signals to the computer to indicate the "home" rotation position of the gun housing portion 93 and to indicate the limit of rotational travel of the gun housing portion 93 in each direction of rotation.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electron-beam welding apparatus comprising:
   a vacuum chamber;
   a gantry entirely within said chamber for adjustably supporting an electron-beam welding gun with x, y and z coordinates of adjustability with respect to mutually perpendicular x-, y- and z- axes within said chamber, said gantry including means telescoping along the z-axis for adjustably supporting the electron-beam welding gun with respect to the z-axis.

2. Apparatus in accordance with claim 1, which comprises means for pivoting said welding gun around the z-axis.

3. Apparatus in accordance with claim 1, which comprises means for tilting said electron beam gun about an axis perpendicular to the z-axis.

4. Apparatus in accordance with claim 3 which includes a turbomolecular pump communicating with said electron-beam gun and attached to said tilting means.

5. Apparatus in accordance with claim 1 in which said gantry comprises a frame having a carriage movable thereon with respect to an x-axis, said carriage having an apparatus thereon which telescopes along the z-axis and which is supported movably with respect to the y-axis.

6. Apparatus in accordance with claim 1, in which said telescoping means comprises telescoping tubes having a collapsed length shorter than the stroke length of the tubes and a supporting telescoping screw within said tubes for supporting the same and having a collapsed length shorter than the stroke length of the screw.

7. Apparatus in accordance with claim 6, which includes a z-axis motor for rotating said telescoping screw, a resolver comprising a stator and a rotor, said stator being mounted to rotate with the outermost of said telescoping tubes, and said rotor being coupled to rotate with the outermost portion of said telescoping screw for providing an output signal component representing the rotation of said telescoping screw by said z-axis motor to indicate the position of the bottom of said telescoping screw with respect to said z-axis, and computer means responsive to the output signal of said resolver for controlling said z-axis motor.

8. Apparatus in accordance with claim 7, which includes a pivot motor for rotating the outermost of said telescoping tubes, said telescoping tubes being rotatably coupled together and being rotatably coupled with the innermost portion of said telescoping screw, and said resolver providing an output signal component representing rotation of said outermost telescoping tube by said pivot motor to indicate any component of change of position of said bottom of said telescoping screw with respect to said z-axis due to rotation of said outermost telescoping tube by said pivot motor.

9. A vertical support comprising:
   telescoping tubes having a collapsed length shorter than the stroke length of the tubes; and
   a supporting telescoping screw within said tubes for supporting the same and having a collapsed length shorter than the stroke length of the screw.

10. A support in accordance with claim 9, in which said telescoping tubes including innermost, outermost and intervening tubes which are longitudinally slidable with respect to each other.

11. A support in accordance with claim 9, in which said telescoping tubes are rotatable as a unit and are non-rotatable with respect to each other.

12. A support in accordance with claim 9, in which said telescoping screw is a ball screw.

13. A support in accordance with claim 9, in which said telescoping screw has telescoping screw portions which are rotatable with respect to each other and which include an outermost screw portion.

14. A support in accordance with claim 13, which includes an innermost telescoping screw portion and a horizontal plate member attached thereto and attached to said innermost tube and supporting said innermost tube and tubes between said innermost and said outermost tube.

15. A support in accordance with claim 13, which includes a pivot motor and in which said outermost tube is rotatable by said pivot motor.

16. A support in accordance with claim 14, which includes a z-axis motor which rotates said outermost screw portion, tending to cause a vertical displacement of said horizontal plate member and a vertical displacement of at least one of said tubes.

* * * * *